Figure 2:
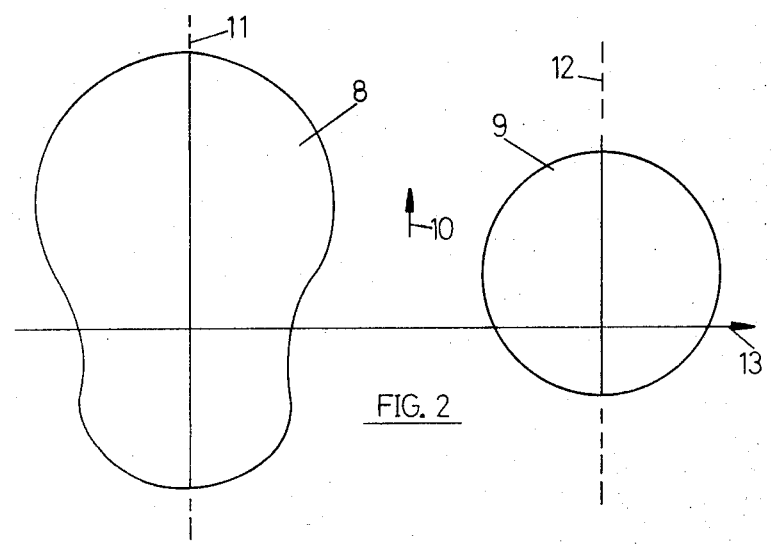

United States Patent [19]
Clarke

[11] 3,840,303
[45] Oct. 8, 1974

[54] DEVICE FOR DETECTION OF BLEMISHES IN THE SURFACE OF SYMMETRICAL PLANAR OBJECTS

[75] Inventor: Graham Morley Clarke, Edinburgh, Scotland

[73] Assignee: Ferranti Limited, Hollinwood, Lancashire, England

[22] Filed: July 18, 1973

[21] Appl. No.: 380,217

[52] U.S. Cl................ 356/200, 250/560, 250/563, 356/160, 356/210, 356/237
[51] Int. Cl.. G01n 21/16, G01b 11/04, G01n 21/48
[58] Field of Search........... 356/120, 159, 160, 163, 356/199, 200, 210, 237; 250/560, 563, 572

[56] References Cited
UNITED STATES PATENTS
3,646,353  2/1972  Bhullar................................ 356/200

*Primary Examiner*—Vincent P. McGraw
*Attorney, Agent, or Firm*—Cameron, Kerkam, Sutton, Stowell & Stowell

[57] ABSTRACT

In a detector of blemishes in the surface of a planar object, or web, which is symmetrical about an axis in the plane of the object, a beam of radiation from a laser in a scanning station is focussed onto the surface and caused to scan transversely to the axis while the object is caused to move past the scanning station parallel to the axis of symmetry. The axis is arranged to be located such that the beam crosses it at a predetermined time into the scan, at which time a datum signal is generated. During each scan, when the beam crosses a leading edge of the object onto the surface, an edge signal is generated. The time between the edge signal and the datum signal is half the time taken for the beam to traverse the surface so that the traverse time can be calculated and used to turn off the detector before the trailing edge is crossed by the beam.

7 Claims, 7 Drawing Figures

PATENTED OCT 8 1974
3,840,303
SHEET 1 OF 3
FIG. 1
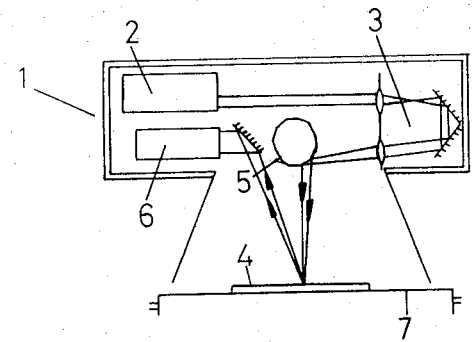
FIG. 3
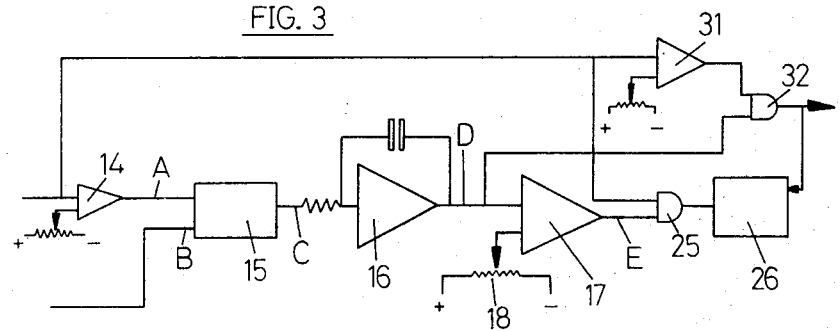
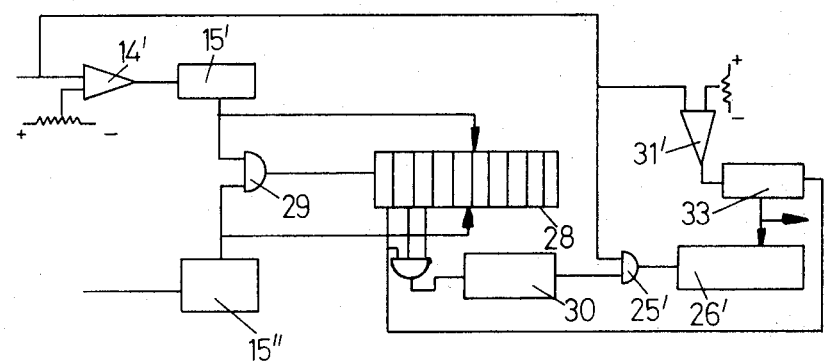
FIG. 5

DEVICE FOR DETECTION OF BLEMISHES IN THE SURFACE OF SYMMETRICAL PLANAR OBJECTS

This invention relates to the detection of blemishes in surfaces.

Detectors of blemishes in surfaces are known and particularly detectors of blemishes in the surface of moving webs. In such detectors a beam of light is focussed on to the surface of a moving web and is scanned over the surface repetitively and transversely to the direction of motion of the web.

Light reflected from the surface is collected and any change in its intensity, caused by a blemish in the surface, is detected and counted. Changes in reflectivity occur, however, when the focussed beam crosses the edges of the web during each scanand such changes are detected as blemishes. Provided that approximate positions of the edges of the web are known, then steps may be taken to ensure that their detection does not cause a false blemish count to be made. Previously it has not been known to scan adequately the surface of an individual object, or of a web whose width varies over wide ranges, without detecting the edges as blemishes.

It is an object of the present invention to provide a detector of blemishes on surfaces of objects or webs when each surface, or the projection of each surface onto a plane, is symmetrical about an axis in that plane, the detector not detecting the edges of the surface as blemishes.

According to the present invention a detector of blemishes in a surface, the surface in which the blemishes are to be detected, or a projection of the surface, being disposed about an axis of symmetry in a viewing plane, comprises a scanning station, arranged to be movable relative to the surface in a plane parallel to said viewing plane and in a direction parallel to said axis of symmetry, the scanning station including a source of a beam of electromagnetic radiation, a lens system for focussing the beam onto the surface, scanning means for causing the beam to scan over the surface transversely to said axis of symmetry, and means for receiving radiation diffusely reflected from the surface and for producing a blemish signal in response to a change in intensity of the received radiation; means for generating an edge signal when the beam crosses the edge of the surface onto the surface; means for generating a datum signal at a predetermined point in each scan, the locus of the predetermined points being arranged to lie along said axis of symmetry; means for determining the interval between the generation of the edge signal and the datum signal, and hence the time taken for the beam to traverse the whole width of the surface; gating means operable for a predetermined fraction of said traverse time; and blemish counting means responsive to operation of the gating means to count said blemish signals.

Figure 4:
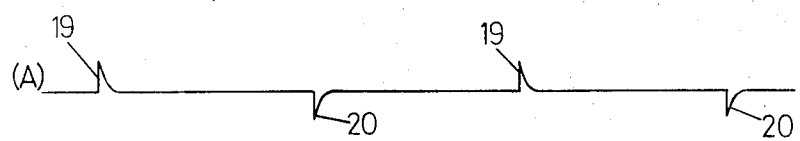
Figure 4:
Figure 4:
Figure 4:
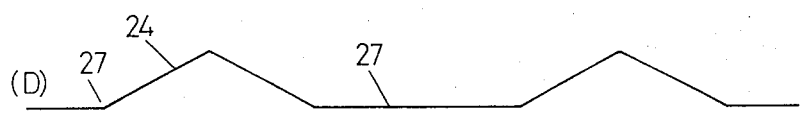
Figure 4:
Figure 5A:
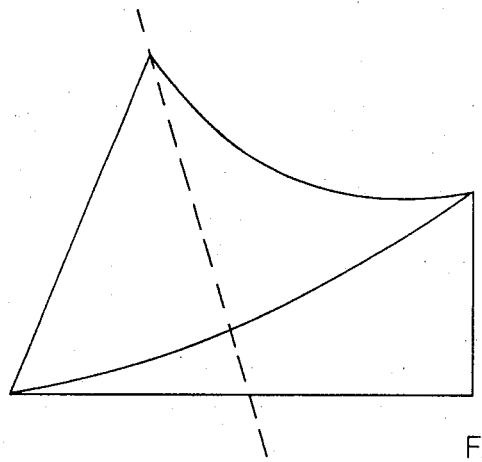
Figure 5B:
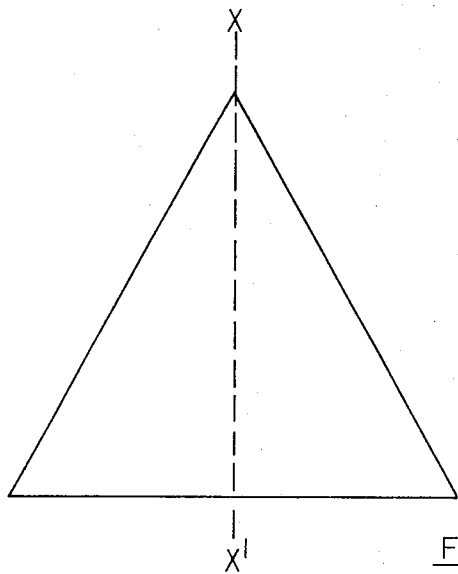

The invention will now be described by way of example with reference to the accompanying drawings, in which:

FIG. 1 is a sectional elevation of the optical apparatus of a blemish detector of known form, FIG. 2 is a plan view of two planar objects, each symmetrical about an axis in its plane, and for which objects the blemish detector according to the invention is suitable, FIGS. 3 and 5 are electrical circuit arrangements for use with the optical apparatus of FIG. 1 to provide a blemish detector according to the present invention, FIG. 4 shows the waveforms of signals at different points in the circuit of FIG. 3 and during a single scan across the objects of FIG. 2, and FIG. 5a is a perspective view of an assymmetrical object which may be scanned by a blemish detector according to the present invention, FIG. 5b comprising a projection of the objects onto a plane in which the projection is symmetrical about an axis in the plane.

Referring to FIG. 1 there is shown a sectional elevation of the optical apparatus of a surface blemish detector 1. Light or near-visible radiation in a continuous beam from a laser 2 is focussed by focussing means 3 onto a surface 4 by way of a reflective facet of a plane multifaceted mirror 5. The mirror 5 is rotatable about an axis parallel to the planes of its facets so that as each facet interupts the beam by moving through it, the beam is caused to scan the surface. If the surface is caused to move in a direction perpendicular to the plane of the Figure then the speed of this movement and the rotational speed of the mirror 5 may be adjusted so that the beam crosses the surface in the form of a raster at the desired line spacing. Light diffusely reflected from the surface 4 is collected in a photodetector 6, such as a photomultiplier tube.

If the finely focussed beam crosses a blemish on the surface then the amount of light reflected at the frequency of the incident light changes, and the change in the signal from the photo-detector is used to give an indication of the position and extent of the blemish in subsequent signal processing apparatus of the blemish detector, and blemish counting means is used to indicate the number of blemishes detected.

In general a surface which it is desired to examine for blemishes does not exactly fill the whole scan. For instance, a continuous web may form the surface 4 and may be made to pass over a roller 7 in the path of the beam. The web and roller will in general have different reflectivities and the changes in reflectivity as the beam crosses the leading and trailing edges of the web will be detected as blemishes. When examining a nominally parallel-sided web by the known form of blemish detector account can be taken of this by using the detection of the leading edge on each scan to start the signal processing apparatus of the blemish counting means, and stopping the counting action slightly before the detection of the trailing edge, by calculating the position of the trailing edge from the detection of the trailing edge on the previous scan.

However, if the width of the web varies unpredictably over a wide range then the position of the trailing edge cannot be calculated from the previous scan so as to stop the signal processing apparatus and the blemish counting means just prior to the detection of the trailing edge.

Such a width variation also applies to an individual object as for a web. Referring to FIG. 2 there is shown a plan view of two planar objects comprising blanks 8 and 9 prior to being folded or embossed to produce a finished article. The blanks are carried on a conveyor (not shown) in the direction of the arrow 10. The blanks are also symmetrical about axes 11 and 12, respectively, in the planes of the blanks, said axes being parallel to the direction of motion of the blanks.

The blanks are supported with the symmetrical axes 11 and 12 in known positions on the conveyor. The blemish detector according to the present invention employs the optical apparatus of FIG. 1 and a single scan of the beam between the points 13(a) and 13(b) and transversely to the direction of motion of the blanks 8 and 9 is represented by the line 13, the beam crossing the axes 11 and 12 at known times into the scan.

Referring now to FIG. 3 there is illustrated a circuit arrangement included in the blemish detector by which signals from the photo detector 6 are used to control the counting of blemishes on the surfaces of the blanks of FIG. 2.

The circuit arrangement comprises an amplitude discriminator 14, arranged to pass blemish-type signals of large amplitude such as from the edge of the surface, a bistable switch 15, having two output states, and an integrating amplifier 16. The output of the integrating amplifier is fed to a voltage comparator 17 which provides a positive signal when the signal from the integrating amplifier 16 exceeds a threshold value determined by a potentiometer 18 connected to a d.c. voltage supply.

The operation of the circuit arrangement of FIG. 3 will now be described with reference to the waveforms depicted in FIGS. 4(A) to 4(E), the waveforms being representative of the signals appearing at corresponding points A to E in the circuit arrangement during the single scan 13 of FIG. 2.

The bistable switch 15 has two inputs, one input receiving a signal A from the amplitude discriminator 14 comprising the output of the photodetector 6, and the other input receiving a signal B from an independent pulse generator (not shown). For clarity it is assumed that the scanned surfaces of the blanks 8 and 9 are unblemished and that the output of the photodetector 6 is as shown in FIG. 4(A) and the same as the output from the amplitude discriminator 14. The signal consists solely of positive going leading edge pulses 19, produced by the change in surface reflectivity as the beam crosses the edge of the blank onto the surface, and negative going trailing-edge pulses 20, produced by the change in surface reflectivity as the beam crosses the edge of the blank off the surface. The signal B produced by the independent generator comprises a series of positive going pulses 21, one pulse being produced coincidentally with the beam crossing each of the predetermined positions of the axes 11 and 12.

The output of the bistable circuit 14 changes from zero to a positive value 22 in response to a positive going input A (pulse 19) and remains at that value until a positive going input B (pulse 21) is received, thereby forming a signal C comprising positive-going square-wave pulses 23.

The change in the input to the integrating amplifier 16 caused by the leading step of the pulse 23 produces an output D which increases linearly with time from zero. At the end of the pulse 23, its trailing step is applied to the integrating amplifier which then produces an output decreasing linearly with time to zero. The rates of increase and decrease in the integrating amplifier output are identical and the output signal D comprises a triangular pulse 24 corresponding to each of the pulses 23 in signal C (FIG. 4(D)). As the increasing portion of the pulse 24 extends for the duration of the corresponding pulse 23, then the complete triangular pulse extends for exactly twice the length of the pulse 23. Also, as the duration of the pulse 23 is the time taken for the beam to scan from the edge of the blank to the axis of symmetry then the duration of the pulse 24 is the time taken for the beam to scan the blank between the edges, irrespective of the width of the blank at that point.

The output of the integrating amplifier 16 is fed to the comparator 17 which is able to produce a constant amplitude output whenever the output of the integrating amplifier is greater than zero, that is, for the whole of the time that the beam is scanning the surface of the blank. The comparator output is used as a gating signal for a gate 25 controlling for blemish counting means 26 to enable any pulses occurring after the pulse 19 and before the end of the gating period to be counted.

In practice the pulses 19 and 20, produced by the edges of each blank are of large amplitude compared with any blemish pulses likely to occur and are slow to decay. Thus if the blemish counting means is gated immediately the pulse 19 occurs, then the decaying part of the pulse has a positive value and is processed as being due to a blemish. The start of the gating period is delayed until the pulse 19 has decayed by applying a threshold level to the comparator 17. Thus threshold level is shown at 27 in FIG. 4(D) and the output signal E from the comparator is only produced when the input from the integrating amplifier has risen above this threshold. Because of the symmetry of the signal from the integrating amplifier the comparator threshold also causes the gating pulse to be curtailed before the trailing edge of the blank is detected. However, this margin at each edge can be kept small in relation to the scanned width. Alternatively the rate of decrease of the integrator output may be made slightly slower than the rate of increase so that the output is above the comparator threshold level 27 until the beam crosses the trailing edge.

The circuit of FIG. 3 may be modified as shown in FIG. 5 so as to be totally digital in operation; the integrating amplifier 16 may be replaced by a reversible counter 28, which begins an increasing count with the application of the edge pulse 19 by way of amplitude discriminator 14, the bistable circuit 15' and gate 29 and then counts down again to zero on the application of the datum pulse 20 by way of bistable circuit 15'' and gate 29. The output of the counter 28 is taken from the first stage and fed to a pulse generator 30 which is arranged to produce an output signal while the count is in series of a preset minimum number of counter steps. The output of the gating circuit 30 is used to open a gate 25' to permit blemish signals to be passed to the blemish counter 26'.

The detector of the present invention also shows advantages in addition to the detection of blemishes. For instance, the presence of imperfections or notches in the edges of the blanks may be detected by scanning both surfaces of the blank in opposite directions. When a notch, extending deeper than the margin occurs it will be detected as a blemish at the beginning/end of the scan of one surface and at the end/beginning of the scan of the other surface and this relationship can be detected and appropriate action taken. Also, the symmetry of the blank can be checked by testing for coincidence between the pulse 20, due to the trailing edge and the return to zero of the integrating amplifier 16 or the counter 28.

Referring again to FIG. 3 the blemish signal is fed by way of an amplitude discriminator 31 which is arranged to pass only the large negative-going pulses associated with the trailing edge of the surface. The pulses 20 are gated with the output of the integrator 17 in a gate 32 such that if they do not occur coincidentally than a rejection signal is produced which stops or marks the surface and possibly removes the blemish count from the counter 26. Similarly with the arrangement of FIG. 5, an amplitude discriminator 31' feeds pulse 20 to verification means comprising a coincidence detector, along with an output from the zero state of the counter 28 such that a rejection signal is produced if the pulse 19 and the zero state count do not occur at the same time.

While the description has been with reference to the use of a laser source, the invention may be carried out using light from a conventional non-coherent source. Also the blanks need not be separate objects and could, for instance, be in the form of a web of widely varying width. Similarly the light could be transmitted by a transparent or translucent surface and then be collected.

An advantage of using a laser is that the narrow beam emitted by the laser may be finely focussed while having a large depth of focus. Thus the blank does not need to be planar as deviation from the plane can be tolerated. For instance, an object having an assymmetrical appearance such as that shown in the perspective view of FIG. 5(A) could be scanned successfully provided that when "viewed" from the scanning station it appears symmetrical about the axis $x-x'$ shown in FIG. 5(b), that is, the projection of the scanned surface onto the plane of the conveyor is symmetrical about the axis $x-x'$ in the plane of the conveyor.

What we claim is:

1. A detector of blemishes in a surface, the surface in which the blemishes are to be detected, or a projection of the surface, being disposed about an axis of symmetry in a viewing plane, comprising a scanning station, arranged to be movable relative to the surface in a plane parallel to said viewing plane and in a direction parallel to said axis of symmetry, the scanning station including a source of a beam of electromagnetic radiation, a lens system for focussing the beam onto the surface, scanning means for causing the beam to scan over the surface transversely to said axis of symmetry, and means for receiving radiation diffusely reflected from the surface and for producing a blemish signal in response to a change in intensity of the received radiation; means for generating an edge signal when the beam crosses the edge of the surface onto the surface, means for generating a datum signal at a predetermined point in each scan, the locus of the predetermined points being arranged to lie along said axis of symmetry; means for determining the interval between the generation of the edge signal and the datum signal, and hence the time taken for the beam to traverse the whole width of the surface; gating means operable for a predetermined fraction of said traverse time; and blemish counting means responsive to operation of the gating means to count said blemish signals.

2. A detector of blemishes as claimed in claim 1 in which the means for determining the time taken for the beam to traverse the surface comprises a dual-slope integrator operable in each scan to produce, in response to an edge signal, an output signal which increases in magnitude in one sense from a zero level and, in response to a subsequent datum signal, to an output signal which decreases in magnitude in said one sense towards zero, said traverse time being the period for which the magnitude of the output signal is greater than zero.

3. A detector of blemishes as claimed in claim 2 in which the gating means comprises a comparator having a preset reference level and arranged to produce a gating signal when the magnitude of the integrator output signal is in excess of said reference level.

4. A detector of blemishes as claimed in claim 1 in which the means for determining the time taken for the beam to traverse the surface comprises a reversible counter operable in each scan, in response to an edge signal, to count in one direction at a predetermined rate from a zero state and, in response to a subsequent datum signal, to count in the other direction at said predetermined rate, said traverse time being the period of time for which the state of the count is greater than zero.

5. A detector of blemishes as claimed in claim 4 in which the gating means comprises a generator operable to produce an output gating signal when the state of the count is in excess of a preset minimum, greater than said zero state.

6. A detector of blemishes as claimed in claim 1 in which the source of the beam of radiation is a laser.

7. A detector of blemishes as claimed in claim 1 further arranged to verify the symmetry of the surface about said axis wherein there is also provided means for generating a further edge signal when the beam crosses the trailing edge of the surface off the surface, and verification means operable to detect whether the beam crosses the trailing edge coincidentally with the end of the calculated traverse time.

* * * * *

O-1050
5/69)

UNITED STATES PATENT OFFICE
CERTIFICATE OF CORRECTION

Patent No. 3,840,303      Dated October 8, 1974

Inventor(s) Graham Morley Clarke

It is certified that error appears in the above-identified patent and that said Letters Patent are hereby corrected as shown below:

Cover page, after item [21] insert:
--[30] Foreign Application Priority Data
   July 29, 1972   Great Britain 35611/72--

Signed and sealed this 4th day of February 1975.

(SEAL)
Attest:

McCOY M. GIBSON JR.
Attesting Officer

C. MARSHALL DANN
Commissioner of Patents